United States Patent
Huang et al.

(10) Patent No.: US 10,638,538 B2
(45) Date of Patent: *Apr. 28, 2020

(54) SYSTEM AND METHOD FOR GROUP DEVICE ACCESS TO WIRELESS NETWORKS

(71) Applicant: Verizon Patent and Licensing Inc., Arlington, VA (US)

(72) Inventors: Ye Huang, San Ramon, CA (US); Lei Song, Fremont, CA (US); Phillip A. Ritter, Danville, CA (US); Bjorn Hjelm, Livermore, CA (US); Thomas W. Haynes, Concord, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/392,256

(22) Filed: Apr. 23, 2019

(65) Prior Publication Data
US 2019/0254112 A1    Aug. 15, 2019

Related U.S. Application Data

(63) Continuation of application No. 15/591,033, filed on May 9, 2017, now Pat. No. 10,334,659.

(51) Int. Cl.
*H04W 76/38* (2018.01)
*H04W 8/18* (2009.01)
(Continued)

(52) U.S. Cl.
CPC ......... *H04W 76/38* (2018.02); *H04L 63/0892* (2013.01); *H04L 63/104* (2013.01);
(Continued)

(58) Field of Classification Search
CPC ... H04L 9/3213; H04L 47/215; H04L 63/102; H04L 63/10; H04L 2209/80; H04L 63/0823; H04L 67/322; H04L 9/3247; H04L 63/062; H04L 63/068; H04L 63/0807; H04L 67/2809; H04L 2463/061; H04L 2463/062; H04L 63/04; H04L 63/06; H04L 63/067; H04L 63/108; G06Q 20/385; H04W 12/06; H04W 12/02; H04W 12/08;
(Continued)

(56) References Cited

U.S. PATENT DOCUMENTS 8,085,783 B2    12/2011   Zhou et al.
8,339,947 B2    12/2012   Lee et al.
(Continued)

*Primary Examiner* — Daniel Lai (57) ABSTRACT

Techniques described herein may allow for the granting and revoking of temporary access, for User Equipment ("UE") devices, to a wireless network. Multiple UEs may be registered with a group, where only a limited quantity of UEs in the group may be active at a given time. Once granted access, a UE device may have limits on the access, such as a maximum duration and/or a data limit. When a particular UE device, in a group, requests access to the network, a Group Device Authentication Server ("GDAS") may determine whether to grant the access, based on how many other UEs in the group (if any) currently have access. The GDAS may also revoke the access once granted (e.g., once the maximum duration has been reached).

20 Claims, 9 Drawing Sheets

400

| Group ID | Max tokens | Max duration | Max data | Device info |
|---|---|---|---|---|
| GROUP_A | 1 | 45 sec | 10 MB | 450-1 |
| GROUP_B | 3 | 10 min | null | |
| GROUP_C | 1 | null | 3 MB | 450-3 |

450-2

| Device ID | UICC | Status | Duration | Data |
|---|---|---|---|---|
| DEVICE_D | UICC_A | idle | null | null |
| DEVICE_E | UICC_B | active | 17s | 1 MB |
| DEVICE_F | null | idle | null | null |

(51) Int. Cl.

| | | |
|---|---|---|
| *H04W 76/10* | (2018.01) | |
| *H04W 48/18* | (2009.01) | |
| *H04W 74/00* | (2009.01) | |
| *H04L 29/06* | (2006.01) | |
| *H04W 12/06* | (2009.01) | |
| *H04W 12/08* | (2009.01) | |
| *H04W 48/08* | (2009.01) | |
| *H04W 4/70* | (2018.01) | |
| *H04W 84/04* | (2009.01) | |

(52) U.S. Cl.
CPC ........... *H04W 8/186* (2013.01); *H04W 12/06* (2013.01); *H04W 12/08* (2013.01); *H04W 48/08* (2013.01); *H04W 48/18* (2013.01); *H04W 74/006* (2013.01); *H04W 76/10* (2018.02); *H04W 4/70* (2018.02); *H04W 84/042* (2013.01)

(58) Field of Classification Search
CPC ......... H04W 12/003; H04W 12/00512; H04W 12/00518; H04W 12/04; H04W 12/04031; H04W 24/02; H04W 28/02; H04W 28/16; H04W 28/20; H04W 76/38; H04W 48/08; H04W 48/18; H04W 76/10; H04W 8/186; H04W 84/042; H04W 4/70
See application file for complete search history.

(56) References Cited

U.S. PATENT DOCUMENTS

| | | | |
|---|---|---|---|
| 8,356,110 B2 | 1/2013 | Udani et al. | |
| 8,811,423 B2 | 8/2014 | Rawlins et al. | |
| 8,838,077 B2 | 9/2014 | Felt et al. | |
| 8,971,842 B2 | 3/2015 | Sadana et al. | |
| 9,059,862 B2 | 6/2015 | Shaikh | |
| 9,202,017 B2 | 12/2015 | Fletcher et al. | |
| 9,277,559 B2 | 3/2016 | Huang et al. | |
| 9,450,879 B2 | 9/2016 | Rector | |
| 9,674,374 B1 | 6/2017 | Bolton et al. | |
| 10,334,659 B2 * | 6/2019 | Huang | H04W 76/10 |
| 2002/0080816 A1 | 6/2002 | Spinar et al. | |
| 2004/0008625 A1 * | 1/2004 | Lee | H04L 12/5601 370/229 |
| 2004/0013089 A1 | 1/2004 | Taneja et al. | |
| 2006/0146874 A1 | 7/2006 | Yuan et al. | |
| 2011/0034193 A1 | 2/2011 | Park et al. | |
| 2011/0167256 A1 * | 7/2011 | Lee | H04L 63/104 713/156 |
| 2011/0269473 A1 | 11/2011 | Ronneke et al. | |
| 2013/0047195 A1 * | 2/2013 | Radhakrishnan | G06F 21/335 726/1 |
| 2013/0088956 A1 | 4/2013 | Zhou et al. | |
| 2013/0091283 A1 | 4/2013 | Omar | |
| 2013/0100955 A1 | 4/2013 | Dunlap et al. | |
| 2013/0191541 A1 | 7/2013 | Kishan et al. | |
| 2014/0003319 A1 | 1/2014 | Etemad | |
| 2014/0226571 A1 | 8/2014 | Das et al. | |
| 2014/0247731 A1 | 9/2014 | Nagaraj | |
| 2015/0019740 A1 | 1/2015 | Zhao | |
| 2015/0101032 A1 * | 4/2015 | Shimakawa | G06F 21/41 726/8 |
| 2015/0106502 A1 | 4/2015 | Shakhmetov et al. | |
| 2015/0117375 A1 | 4/2015 | Sartori et al. | |
| 2015/0163813 A1 | 6/2015 | Zhang et al. | |
| 2015/0237071 A1 * | 8/2015 | Maher | H04L 63/20 726/1 |
| 2016/0007233 A1 | 1/2016 | Rao et al. | |
| 2016/0021646 A1 | 1/2016 | Hu et al. | |
| 2016/0095024 A1 | 3/2016 | Chae et al. | |
| 2016/0295595 A1 | 10/2016 | Chae et al. | |
| 2016/0374109 A1 | 12/2016 | Rico Alvarino et al. | |
| 2017/0006522 A1 | 1/2017 | Nishimura et al. | |
| 2017/0013578 A1 | 1/2017 | Wei et al. | |
| 2017/0142741 A1 | 5/2017 | Kaur et al. | |
| 2017/0295567 A1 | 10/2017 | Chen et al. | |
| 2018/0084407 A1 | 3/2018 | Jung et al. | |
| 2018/0213521 A1 | 7/2018 | Martin et al. | |

\* cited by examiner

SYSTEM AND METHOD FOR GROUP DEVICE ACCESS TO WIRELESS NETWORKS

CROSS-REFERENCE TO RELATED APPLICATION

This application is a Continuation of U.S. patent application Ser. No. 15/591,033 (U.S. Patent Application Pub. No. 2018/0332629), filed May 9, 2017, titled "SYSTEM AND METHOD FOR GROUP DEVICE ACCESS TO WIRELESS NETWORKS," the content of which is herein incorporated by reference in its entirety.

BACKGROUND

In today's modern world, the use of wireless devices, such as mobile phones, Internet of Things ("IoT") devices, Machine-to-Machine ("M2M") devices, etc., is increasing at a rapid rate. Provisioning these devices, as well as paying for wireless data subscriptions, can prove relatively costly in terms of resources, memory, processing power, and engineering time. Moreover, many types of devices, such as IoT devices, do not often need to transmit large amounts of data, and the transmission of data by such devices is not typically as frequent as consumer smartphone users. Therefore, much of the cost can prove wasteful with regard to network resources and customer subscription costs.

DETAILED DESCRIPTION OF PREFERRED EMBODIMENTS

The following detailed description refers to the accompanying drawings. The same reference numbers in different drawings may identify the same or similar elements.

Systems and/or methods, described herein, may allow for groups of devices to be registered with a Group Device Access System ("GDAS"). Each group, registered with the GDAS, may be associated with a set of access tokens, which may be assigned to devices in the group on a temporary basis. That is, when a device, within a group, is assigned an access token on a temporary basis, that device may access a wireless telecommunications network (e.g., a cellular network and/or some other type of wireless network), and communicate with one or more other devices (e.g., an application server) via the wireless telecommunications network for the duration that the access token is active. On the other hand, devices within a group, which do not have an access token assigned, may not be permitted (e.g., by the network) to access the network.

In this manner, multiple devices, such as IoT devices and/or other types of devices that typically transmit or receive relatively small amounts of data, and/or transmit or receive data on a relatively infrequent basis, may effectively have access to a wireless network, without needing to have each device being actively provisioned on a permanent basis. Dynamically provisioning such devices on a temporary, or "as needed" basis, may reduce the cost of using such devices, while having minimal (or no) impact on the operation of the devices. Further, as described below, some embodiments may dynamically share Uniform Integrated Circuit Cards ("UICCs") within a group, thereby allowing fewer UICCs to be provisioned with the network, thus saving resources (e.g., processing, memory, and/or other resources associated with provisioning UICCs with the network) and costs (e.g., as compared to implementations in which each device is associated with one UICC).

Figure 1A:
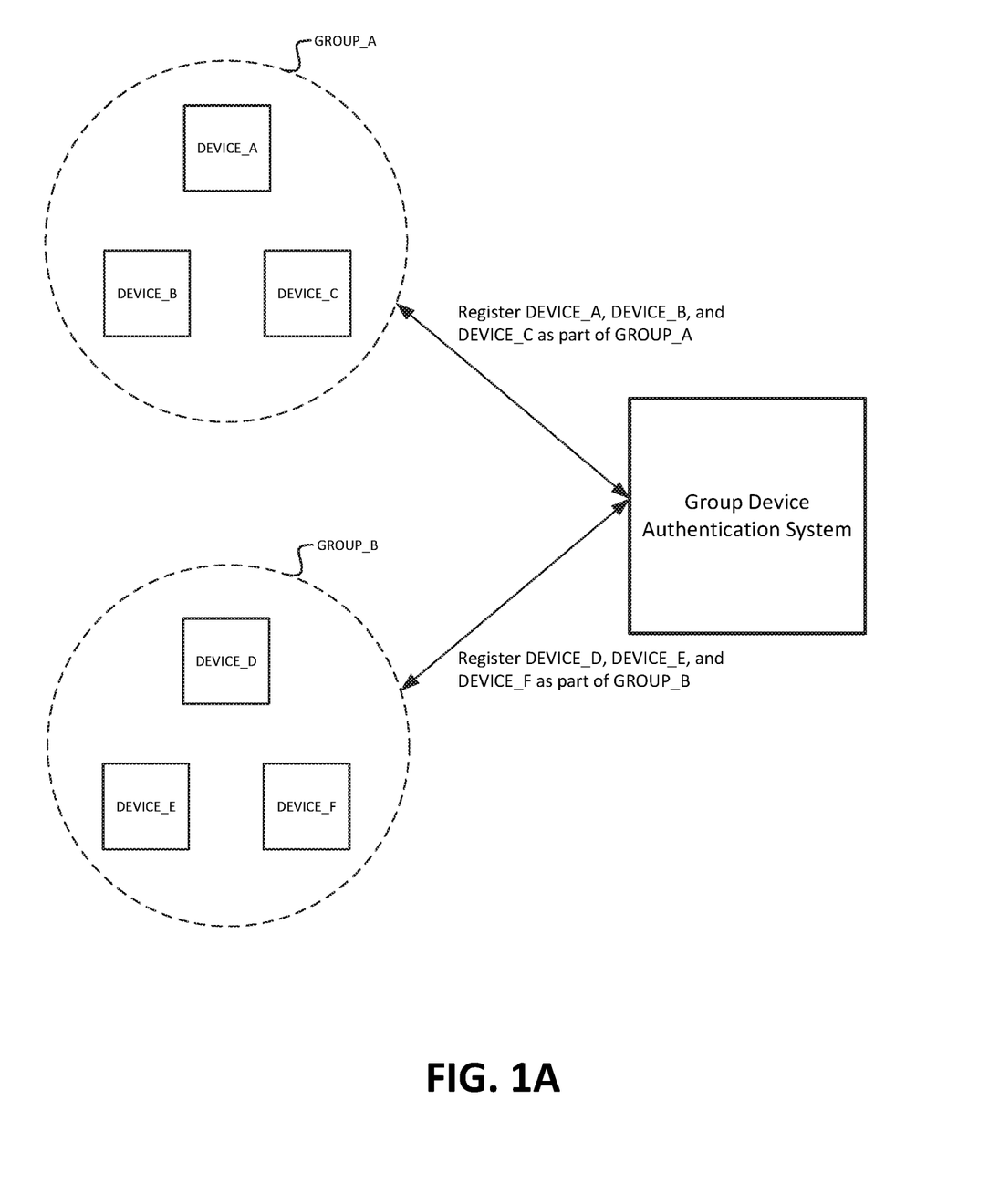
FIGS. 1A-1C illustrate an example overview of one or more implementations described herein.

For example, as shown in FIG. 1A, three example devices (i.e., DEVICE_A, DEVICE_B, and DEVICE_C) may be registered with a GDAS as being included in a first group (i.e., GROUP_A), while another three example devices (i.e., DEVICE_D, DEVICE_E, and DEVICE_F) may be registered as being included in a second group (i.e., GROUP_B). The registration may occur, for example, when the devices are purchased, initially turned on, and/or at some other time. As described below, each group may be registered with a set of parameters, including quantity of access tokens, duration of access tokens, data limits associated with access tokens, etc.

Figure 1B:
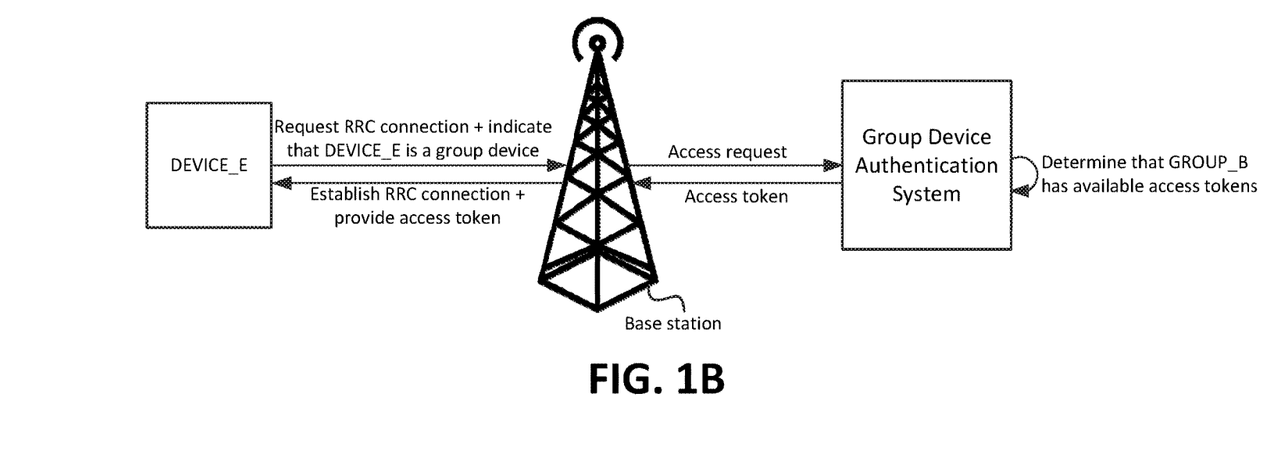

As shown in FIG. 1B, one of the devices (i.e., DEVICE_E, in this example) may request a Radio Resource Control ("RRC") connection to a base station of a wireless network. For instance, the device may have data to transmit to an application server, and/or may be performing a periodic check for data that is to be sent to the device. When requesting the RRC connection, the device may include an indication that it is a group device. For instance, the device may output an RRC Connection Request to the base station, and the RRC Connection Request may include a flag indicating that the device is a group device (e.g., a member of GROUP_B). Additionally, or alternatively, the RRC Connection Request may include identifying information of the device (e.g., a hardware identifier, such as an International Mobile Subscriber Identity ("IMSI") value or an International Mobile Station Equipment Identity ("IMEI")), or information identifying the group to which the device belongs (e.g., a name of the group or some other identifier).

Based on receiving the RRC Connection Request and determining that the device is a group device (as used herein, the term "group device" refers to a device that is in a group that is registered with a GDAS), the base station may forward an access request to the GDAS. As described below, the GDAS may be implemented as part of, or may be communicatively coupled to, a core and/or a Radio Access Network ("RAN") of a wireless telecommunications network.

The GDAS may determine, based on receiving the request, whether the group with which the device is associated (i.e., GROUP_B, in this example) has access to any available access tokens. In some situations, the group may not have available access tokens, such as when the maximum quantity of access tokens have already been assigned and are currently active. Assuming an access token is available, the GDAS may provide the token to the base station, and the base station may establish an RRC connection and provide (or grant) the access token to the device.

Figure 1C:
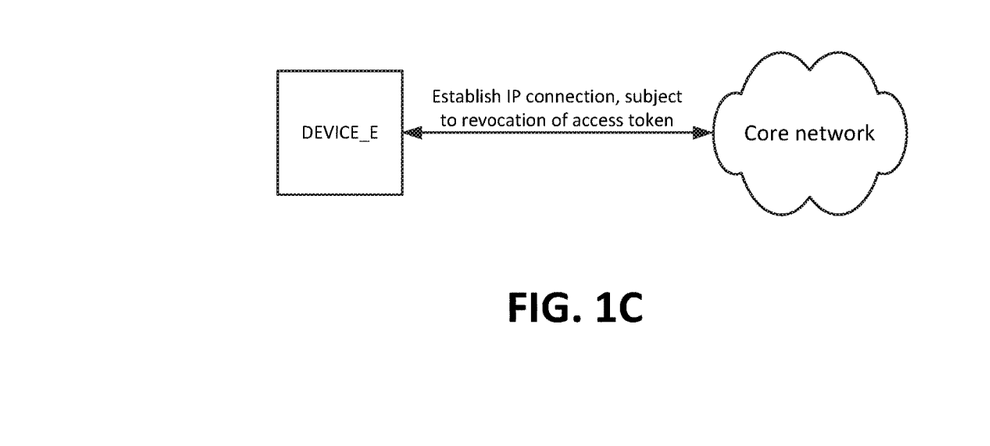

As shown in FIG. 1C, once the device receives the access token, the device may establish an Internet Protocol ("IP") connection (and/or some other type of connection) with a core network, via which the device may communicate with one or more other devices or networks (e.g., a Packet Data Network ("PDN"), such as the Internet). The connection may be subject to revocation of the access token, such as when the duration associated with the access token expires. As described below, upon expiration of the access token (or based on some other reason to revoke the access token), the GDAS may signal the network to break, terminate, or "tear down," the established connection with the device.

Figure 2:
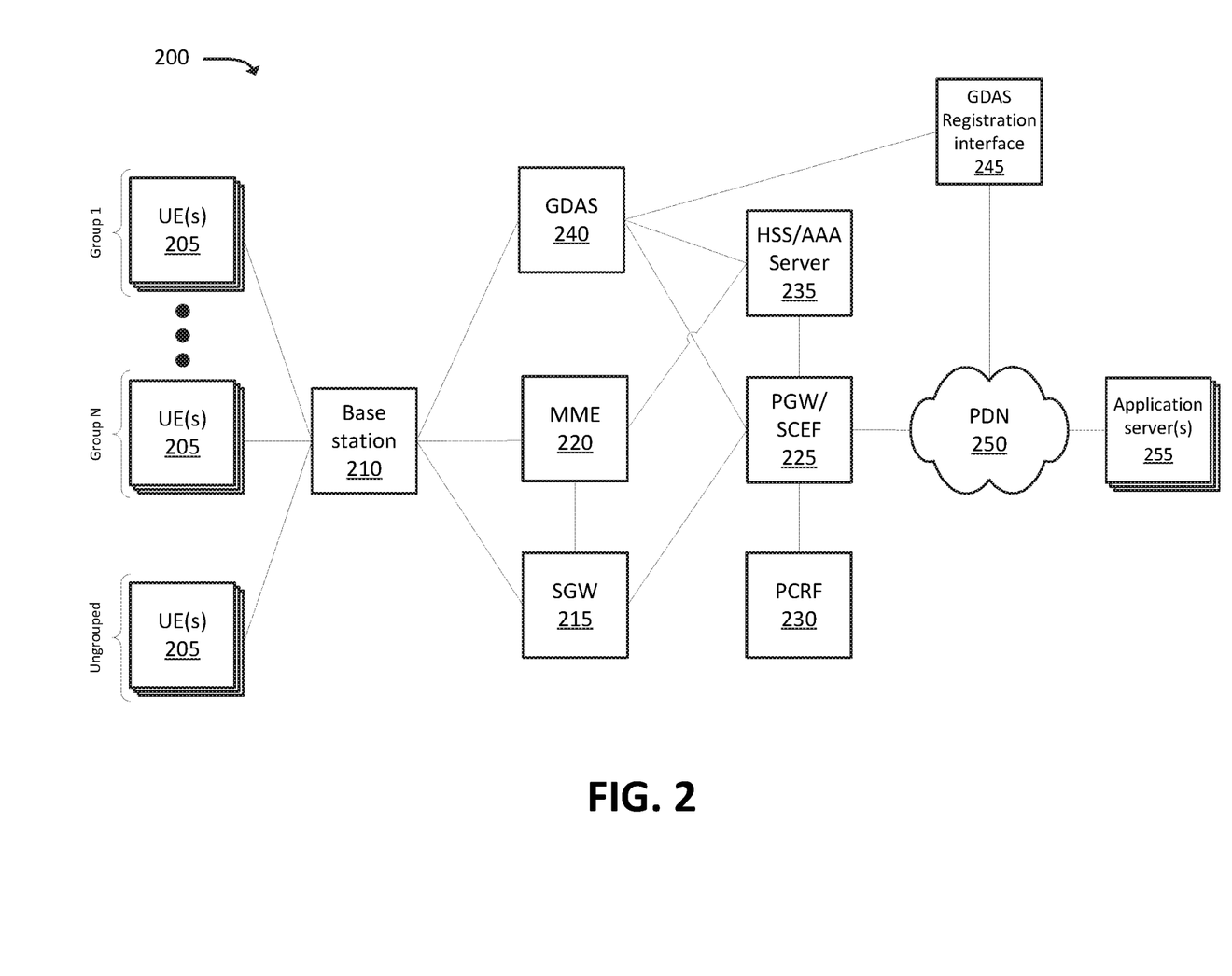
FIG. 2 illustrates an example environment, in which systems and/or methods, described herein, may be implemented.

FIG. 2 illustrates example environment 200, in which systems and/or methods described herein may be implemented. As shown in FIG. 2, environment 200 may include one or more UEs 205, base stations 210, SGW 215, Mobility Management Entity ("MME") 220, PDN gateway ("PGW") and/or Service Capability Exposure Function ("SCEF") (referred to herein as "PGW/SCEF") 225, policy and charging rules function ("PCRF") 230, home subscriber server ("HSS")/authentication, authorization, accounting ("AAA") server 235 (hereinafter referred to as "HSS/AAA server 235"), GDAS 240, GDAS registration interface 245, PDN 250, and one or more application servers 255.

While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or base stations 210 (which may take the form of evolved NodeBs ("eNBs")), via which UE 205 may communicate with the EPC network. The EPC network may include one or more SGWs 215, PGW/SCEFs 225, and/or MMES 220, and may enable UE 205 to communicate with PDN 250 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with base station 210 and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an IoT device (e.g., a sensor, a smart home appliance, or the like); an M2M device; or another type of mobile computation and communication device. UE 205 may send traffic to and/or receive traffic from PDN 250 via base station 210, SGW 215, and/or PGW/SCEF 225.

As mentioned above, and as further described below, UEs 205 may be organized into groups (e.g., Group 1 through Group N, where N is an integer greater than or equal to 1). As also described in more detail below, access to the core network (e.g., whether base station 210 and/or PGW/SCEF 225 accept connections from UE 205) may depend on whether a group, to which UE 205 belongs, has access tokens available. As also shown in FIG. 2, one or more UEs 205 may be ungrouped. Access to the core network by the ungrouped UEs 205 may be implemented independently of the techniques described herein.

Base station 210 may each include one or more network devices that receive, process, and/or transmit traffic, such as calls, audio, video, text, and/or other data, destined for and/or received from UE 205. In one example, base station 210 may be part of an LTE network, a 5G network, another advanced network, etc. Base station 210 may receive traffic, destined for UE 205, from SGW 215, PGW/SCEF 225, and/or PDN 250, and may output the traffic to UE 205. Base station 210 may also receive traffic from UE 205, and may output the traffic to its intended destination via SGW 215, PGW/SCEF 225, and/or PDN 250.

As described in more detail below, base station 210 may identify requests from UEs 205 that are assigned to groups (e.g., UEs 205 that are "group devices"). Base station 210 may communicate with GDAS 240, as described below, in order to facilitate the granting of access tokens for UEs 205 that are group devices, such that the UEs 205 can obtain temporary access to the network.

SGW 215 may include one or more network devices that gather, process, search, store, and/or provide information in a manner described herein. SGW 215 may, for example, aggregate traffic received from one or more base stations 210, and may send the aggregated traffic to PDN 250 via PGW/SCEF 225.

MME 220 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205.

PGW/SCEF 225 may include one or more network devices that gather, process, search, store, and/or provide information in a manner described herein. PGW/SCEF 225 may aggregate traffic received from one or more SGWs 215, etc. and may send the aggregated traffic to PDN 250. PGW/SCEF 225 may also, or alternatively, receive traffic from PDN 250 and may send the traffic toward UE 205 via base station 210 and/or SGW 215.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. HSS/AAA server 235 may perform authentication, authorization, and/or accounting operations associated with the subscriber and/or a communication session with UE 205.

GDAS 240 may include one or more devices (e.g., a device and/or a collection of devices) that facilitate temporary network access (e.g., connectivity through PGW/SCEF 225) to group devices (e.g., UEs 205 that have been assigned to groups). As discussed herein, GDAS 240 may communicate with base station 210 to identify requests for access, and may communicate with PGW/SCEF 225 to provide or revoke access to group devices. In some embodiments, some or all of the functionality, described herein with respect to GDAS 240, may be implemented by one or more existing devices, such as base station 210 or PGW/SCEF 225. GDAS 240 may communicate with HSS/AAA server 235, in order to maintain a set of UICCs that are recognized, by HSS/AAA server 235, as valid UICCs. As described below, the quantity of UICCs, maintained by GDAS 240 for a particular group, may be based on the quantity of access tokens associated with the group.

GDAS registration interface 245 may include one or more devices (e.g., a device and/or a collection of devices) that communicate with UE 205, and/or another device (e.g., via PDN 250), in order to receive instructions and/or requests to create and/or modify groups. For instance, GDAS registration interface 245 may provide an Internet-accessible portal and/or web page, via which groups can be created or modified. In some implementations, GDAS registration interface 245 may be accessible via one or more other networks or devices, in addition to, or in lieu of, the Internet. In some embodiments, GDAS 240 and GDAS registration interface 245 may be communicatively coupled via PDN 250 and/or some other communication pathway. In some embodiments, GDAS 240 and GDAS registration interface 245 may be implemented by the same device, or the same set of devices.

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW/SCEF 225, to data servers, application servers, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Application server 255 may include one or more devices (e.g., a device and/or a collection of devices) that communicate with UE 205. For example, application server 255 may implement an application related to the function of UE 205, in the case where UE 205 is, or includes, an IoT device. Additionally, or alternatively, application server 255 may implement an application that communicates with an application executed by UE 205.

Figure 3:
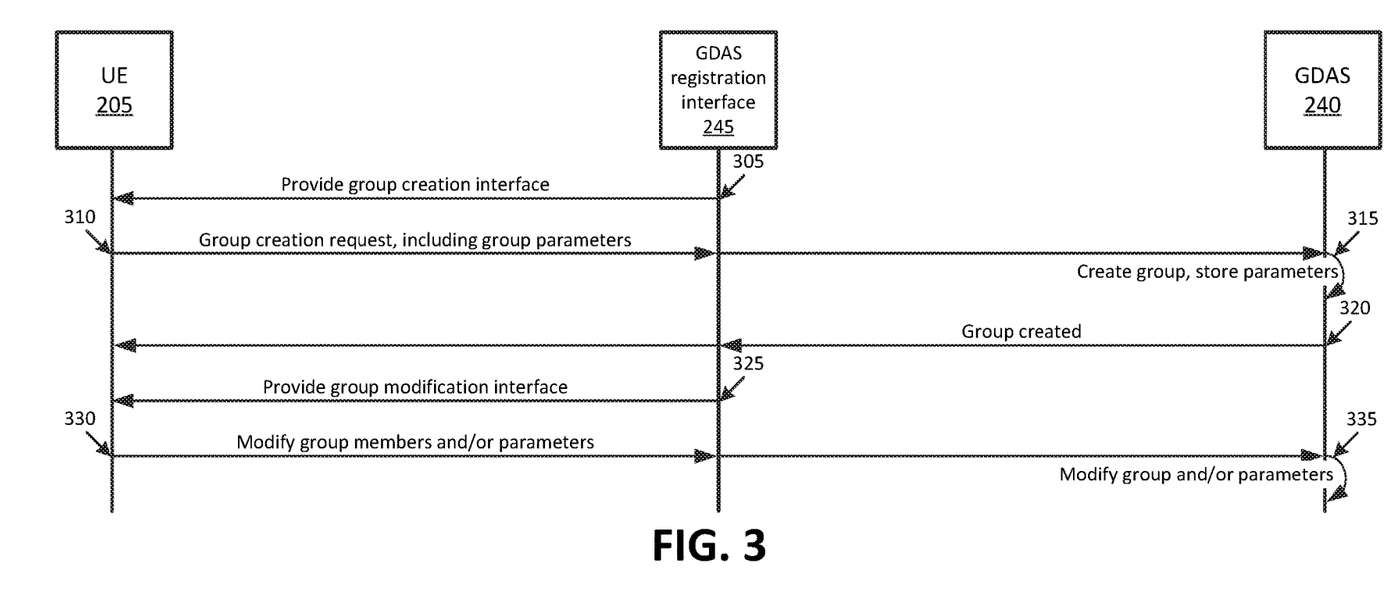
FIG. 3 illustrates an example call flow for establishing and/or modifying a group of devices with a Group Device Authentication System ("GDAS")

FIG. 3 illustrates an example signal flow of a registration and/or modification of a group. As shown, GDAS registration interface 245 may provide (at 305) a group creation interface to UE 205. The group creation interface may include, for example, a graphical user interface ("GUI") that is provided via a web portal, or via some other technique. The group creation interface may be provided in response to, for example, UE 205 accessing a Uniform Resource Locator ("URL") associated with the group creation interface, and/or executing an application that is configured to communicate with GDAS registration interface 245. In some embodiments, UE 205 may be a device that is intended to be included in the desired group. In some embodiments, UE 205 may be a device that is not intended to be included in the desired group (e.g., a workstation, a laptop computer, a tablet computer, etc. that is used for the purpose of accessing GDAS registration interface 245).

The group interface may include options to specify parameters for the desired group, such as how many devices are allowed to have simultaneous access, a maximum duration of access per session, a maximum amount of data, and/or a maximum quantity of messages that can be sent and/or received per session, and/or other parameters (e.g., parameters that specify limits on temporary access for the group).

The parameters may also include identifying information for the devices in the group, such as IMEI values, IMSI values, and/or some other sort of identifier that can be used to uniquely identify the devices in the group. The device identification information may be input manually (e.g., by reading values that are physically present on the device (e.g., etched onto the back of the device or printed on a sticker under a battery cover of the device) and inputting the values via the group creation interface), or in some automated fashion. For instance, a camera of UE 205 (i.e., UE 205 which is accessing the group creation interface) may be used to capture an image of the device to be added to the group, where the image includes a hardware identifier that is physically present on the device. In this example, GDAS registration interface 245 may extract the device identifier from the image using image recognition techniques. As another example, UE 205 may be communicatively coupled to the device to be added to the group via a short-range wireless protocol, such as Bluetooth®, WiFi Direct®, Near Field Communications ("NFC"), and/or some other type of communication technique. Through its communication interface with the device to be added, UE 205 may obtain the device identifier from the device.

Figure 4:
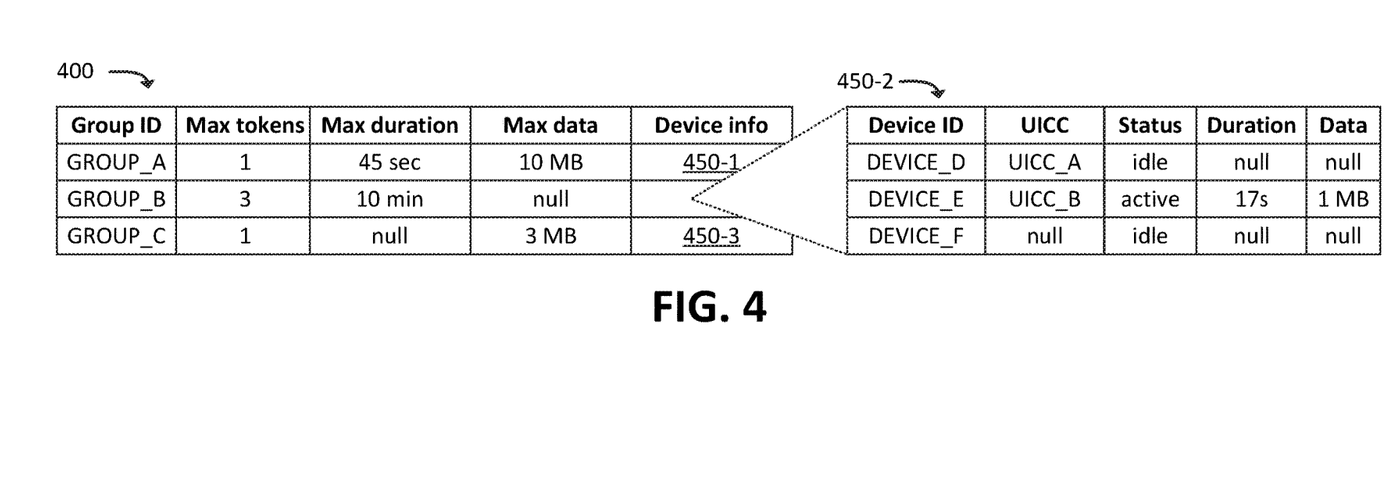
FIG. 4 illustrates example data structures that may be used (e.g., by a GDAS) to maintain information regarding groups of devices.

UE 205 may provide (at 310) a group creation request to GDAS registration interface 245, which includes the group parameters specified via the group creation interface. The group creation request may be forwarded to GDAS 240 (e.g., via a communicative interface between GDAS registration interface 245 and GDAS 240), and GDAS 240 may create (at 315) the group and store the group parameters. While not specifically discussed here, additional authentication, authorization, and/or billing-related processes may be performed in order to ensure that UE 205 is authorized to create the group, and that an entity associated with the group is billed appropriately for the access provided to the network in accordance with embodiments described herein. GDAS 240 may store information regarding the created group (along with other groups) in a database or another type of data structure. An example data structure 400, which may be stored by GDAS 240 for storing information regarding groups and their associated parameters, is shown in FIG. 4, and is described below.

As shown, data structure 400 may include a group identifier ("Group ID"), a maximum quantity of tokens for each group ("Max tokens"), a maximum duration for a particular session ("Max duration"), and a maximum amount of data that can be transferred during a particular session ("Max data"). As shown in this example, not all parameters for a group may have been defined. For example, GROUP_C may not have a maximum session duration defined (denoted in the figure as "null"). In this scenario, a session may be limited only by how much data is transferred to and/or from a device during a session. As another example, GROUP_B may not have a maximum amount of data defined. In this scenario, a session may be limited only by how long the session lasts (i.e., up to 10 minutes, in this example).

Data structure 400 may also include device information ("Device info") 450 for each group (e.g., as shown, device information 450-1 for GROUP_A, 450-2 for GROUP_B, and 450-3 for GROUP_C). Device information 450-2, which relates to the devices in GROUP_B is shown in greater detail in FIG. 4. As shown, device information 450, for a particular group, may include a device identifier ("Device ID") for devices in the group. The device identifier may include an IMEI value, an IMSI value, and/or some other identifier of each device in the group.

Device information 450 may also include UICC information. As will be described below, a UICC (e.g., a "soft" UICC) may be provided to a group device, in order to facilitate authentication and communication between the group device and the network. The UICC information may include an identifier that uniquely identifies the UICC, and/or may include the UICC itself. In some embodiments, the quantity of UICCs, for a particular group, may be limited to the maximum number of tokens associated with the group. In some embodiments, the quantity of UICCs for a particular group may not be so limited.

Device information 450 may further include "status" information, indicating whether a particular group device is "idle" or "active." A group device may be indicated as "active," in this data structure, when the group device is currently active on a communication session (e.g., when a token has been issued for the group device). On the other hand, a group device may be indicated as "idle" when the group device is not currently active on a communication session.

Device information 450 may also include fields for "Duration" and "Data." These fields may indicate the duration of a communication session, and the amount of data transferred during the communication session. As described below, this information may be used to limit the access of the group device according to the specified parameters associated with the group, so that each session does not exceed the parameters. Furthermore, even when a particular parameter has not been set (e.g., GROUP_B does not have a maximum amount of data per session, in this example), device information 450 may still track the parameter for analytics research, and/or for other purposes.

The fields shown in FIG. 4 are provided for explanatory purposes only. In some embodiments, device information 450 may include additional, fewer, and/or different information than shown in FIG. 4. For example, while shown in FIG. 4 as simply "data," in some embodiments, parameters may specify limits for uplink data (i.e., data transferred from a particular group device) and/or for downlink data (i.e., data transferred to the group device), which may be different limits. As another example, device information 450 may specify other types of information that can be used to limit the amount or nature of access per session (e.g., per granted access token). For instance, device information 450 may specify one or more types of data that are permitted to be transmitted while using an access token (e.g., where "type" refers to an application associated with particular data, a type of content associated with particular data (e.g., voice, video, streaming content, etc.), a type of messaging or signaling protocol associated with particular data). As another example, device information 450 may specify a maximum allowable data rate for data sent and/or received by a device that is using an access token.

Returning to FIG. 3, GDAS 240 may output (at 320) an indication that the group was created. The indication may be provided to UE 205 (e.g., via GDAS registration interface 245), such that a user of UE 205 receives confirmation that the group was created.

At a later time, an entity associated with administrating the group (e.g., a user of UE 205, an administrator associated with GDAS 240 or application server 255) may desire to modify the group. For example, the entity may desire to add devices to the group, remove devices from the group, and/or modify other parameters associated with the group. In order to facilitate the modification of the group, GDAS registration interface 245 may provide (at 325) a group modification interface, in a similar manner as the group creation interface was previously provided (at 305). UE 205 may receive modifications to the group (e.g., adding or deleting group members, and/or modifying group parameters), and may output (at 330) the modifications to GDAS registration interface 245, which may forward the modifications to GDAS 240. GDAS 240 may modify (at 335) the group members and/or group parameters by, for example, modifying entries in data structures 400 and/or 450.

Figure 5:
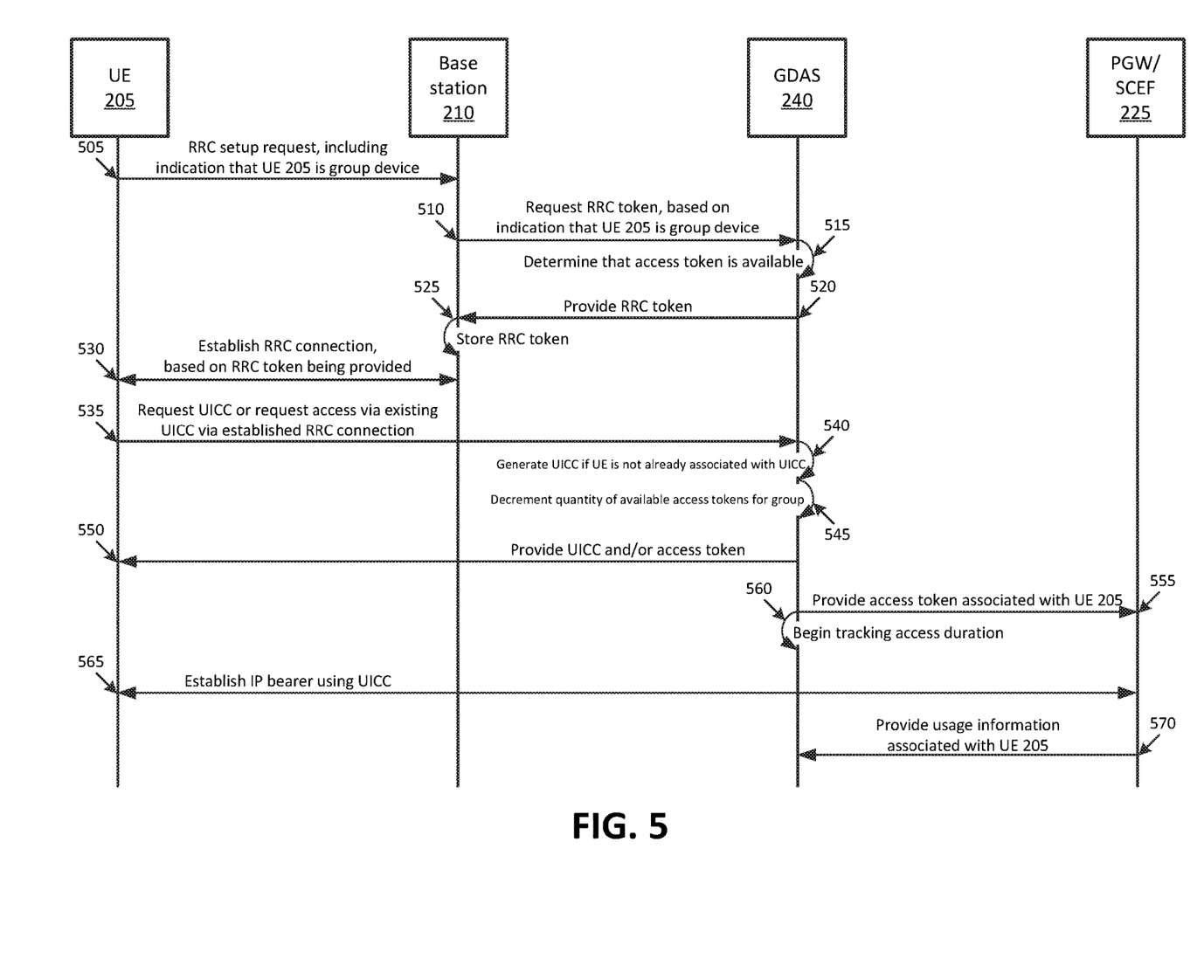
FIG. 5 illustrates an example signal flow for granting access to a device that is in a group registered with the GDAS.

FIG. 5 illustrates an example signal flow for granting access to a group device. As shown, UE 205 (i.e., the "group device," in this example) may output a request to set up an RRC connection to base station 210. The request may indicate that UE 205 is a group device (e.g., by setting a flag in the RRC request). In some embodiments, UE 205 may indicate which group UE 205 belongs to (e.g., the RRC request may include a name or other identifier of the group). The request may include an identifier of UE 205, such as an IMEI value, an IMSI value, and/or some other identifier of UE 205. In some embodiments, the request may not specifically indicate that UE 205 is a group device, even if UE 205 is a group device.

Once base station 210 receives the request, base station 210 may determine that UE 205 is a group device (i.e., a device that has been previously registered, with GDAS 240, as belonging to a particular group), based on the indication included in the RRC connection request. In some embodiments (e.g., if UE 205 does not indicate that UE 205 is a group device, even though UE 205 is a group device), base station 210 may query GDAS 240, and/or some other device, to determine whether UE 205 is a group device (not shown in FIG. 5). For instance, base station 210 may query GDAS 240, with an identifier of UE 205 (e.g., the IMEI or IMSI value of UE 205, included in the RRC connection request). GDAS 240 may identify that UE 205 is a group device (e.g., by identifying the identifier of UE 205 in data structures 400 and/or 450), and may notify base station 210 that UE 205 is a group device.

Based on identifying that UE 205 is a group device, base station 210 may request (at 510) an RRC token from GDAS 240. GDAS 240 may determine whether an access token is available for the group to which UE 205 belongs. For example, GDAS 240 may determine the maximum quantity of access tokens available for the group (e.g., as indicated by the "Max tokens" value for the group in data structure 400), as well as the total quantity of active access tokens for the group (e.g., as indicated by the number of devices for which the "Status" value indicates "active"). This figure describes an example situation in which it is determined that one or more access tokens are available, whereas FIG. 6 describes an example situation in which it is determined that no access tokens are available.

As used herein, an "RRC token" is used to facilitate connectivity between UE 205 and base station 210 (e.g., indicates, to base station 210, that a radio bearer is authorized to be established between UE 205 and base station 210). As also used herein, an "access token" is used to facilitate connectivity between UE 205 and PGW/SCEF 225 (e.g., indicates, to PGW/SCEF 225, that an IP connection is authorized to be established between UE 205 and PGW/SCEF 225). In some embodiments, available access tokens and available RRC tokens may have a one-to-one correlation. That is, if at least one access token is available for a group, then at least one RRC token would be available as well for that group. On the other hand, if no access tokens are available for a group, then no RRC tokens would be available for that group. Thus, determining whether an access token is available would also, in such embodiments, be equivalent to determining whether an RRC token is available.

Based on determining (at 515) that an access token is available, GDAS 240 may provide (at 520) an RRC token to base station 210. The RRC token may indicate an identifier of UE 205 (e.g., an IMSI value, an IMEI value, and/or some other identifier). In some embodiments, the RRC token may be generated by GDAS 240 based on GDAS 240 determining (at 515) that an access token is available. The RRC token may, in some embodiments, indicate a duration for which UE 205 is allowed to communicate with base station 210. The duration may be, for instance, the "Max duration" (shown in data structure 400) for the group to which UE 205 belongs. In some embodiments, the duration may be different than the "Max duration" for the group, but may be based on the "Max duration" (e.g., may be the "Max duration" plus 10 seconds, the "Max duration" multiplied by 1.1, and/or some other function of the "Max duration"). As described below, in some embodiments, base station 210 may monitor the duration of the connection between UE 205 and base station 210 (once a connection is made), and break the connection between UE 205 and base station 210 once the duration (indicated by the RRC token) expires.

In some embodiments, the RRC token may indicate a maximum amount of data that may be transferred to and/or from UE 205. As described below, in some embodiments, base station 210 may monitor the amount of data transferred to and/or from UE 205, via base station 210 (once a connection is made), and break the connection between UE 205 and base station 210 once the amount of data (indicated by the RRC token) has been transferred to and/or from UE 205 via base station 210.

In other embodiments, the RRC token may not indicate a maximum duration or amount of data for which UE 205 is permitted access. As described below, in such embodiments, the nature of the access granted to UE 205 may be controlled by one or more other devices or techniques.

Base station 210 may store (at 525) the received RRC token. As mentioned above, based on the RRC token, base station 210 may determine that an RRC connection, between UE 205 and base station 210, is authorized to be made, and may establish (at 530) an RRC connection based on the request (made at 505) and further based on the received RRC token.

Once an RRC connection has been established between UE 205 and base station 210, UE 205 may communicate with GDAS 240, via the established connection, to request access to the core network (e.g., permission to establish a connection with PGW/SCEF 225). For example, UE 205 may be pre-configured with information (e.g., an IP address of GDAS 240, a URL, a Uniform Resource Indicator ("URI"), etc.) needed to communicate with GDAS 240. In order to request the access, UE 205 may determine whether UE 205 has a UICC, which was previously provided by GDAS 240 (e.g., as part of a previous temporary authentication process). If UE 205 was not previously granted a UICC by GDAS 240, then UE 205 may request (at 535) a UICC from GDAS 240. If, on the other hand, a UICC was previously provided to GDAS 240, then UE may request an activation request of the existing UICC.

In the event that UE 205 has requested (at 535) a UICC, GDAS 240 may generate (at 540) a UICC, and/or may select a UICC from a pool of previously generated UICCs. In some situations, even if UE 205 has previously been granted a UICC, that UICC may be in use by another device (e.g., another device in the same group). In these situations, GDAS 240 may generate and/or select a different UICC for UE 205 (even if UE 205 has not specifically requested a new UICC). In some embodiments, GDAS 240 may communicate with HSS/AAA server 235 regarding the UICCs, such that the UICCs are recognized by HSS/AAA server 235 as being provisioned for the network.

GDAS 240 may also decrement (at 545) a quantity of available access tokens, in anticipation of granting access to UE 205. For example, GDAS 240 may set a "Status" associated with UE 205 as "active" in data structure 450. In some embodiments, GDAS 240 may maintain a counter of active (or available) access tokens, and may increment (or decrement) the counter based on granting an access token to UE 205. As mentioned above, the access token may be (or may include) information that can be used to indicate, to PGW/SCEF 225, that UE 205 is authorized to access PGW/SCEF 225.

GDAS 240 may provide (at 550) the access token (and, if applicable, the UICC) to UE 205. In some embodiments, GDAS 240 may not provide the access token to UE 205. In some such embodiments, GDAS 240 may simply notify UE 205 that UE 205 has been authorized to access PGW/SCEF 225. In some embodiments, GDAS 240 may indicate a maximum session duration when providing the access token and/or when notifying UE 205 that UE 205 has been authorized.

GDAS 240 may provide (at 555) the access token to PGW/SCEF 225. The access token may indicate, for instance, an identifier of UE 205 (e.g., an IMSI or IMEI value of UE 205), UICC information (e.g., information associated with the UICC that has been provided to UE 205), and/or information that indicates limits on the temporary access granted to UE 205 (e.g., a maximum duration, a maximum amount of data transferred, etc.). In some embodiments, GDAS 240 may not provide any information to PGW/SCEF 225 regarding limits on the access. GDAS 240 may begin tracking (at 560) the duration of the access granted to UE 205. Additionally, or alternatively, PGW/SCEF 225 may begin tracking the duration, once the access token is received from GDAS 240.

UE 205 and PGW/SCEF 225 may establish (at 565) an IP bearer, with UE 205 using the previously provided UICC. In some embodiments, PGW/SCEF 225 may authenticate the UICC based on information previously provided by GDAS 240 (e.g., at 555). In some embodiments, PGW/SCEF 225 may communicate with HSS/AAA server 235 to authenticate the UICC (e.g., in embodiments where the UICC has been provided to, and stored by, HSS/AAA server 235). In some embodiments, PGW/SCEF 225 may begin tracking the duration and/or amount of data transferred, after the IP bearer between UE 205 and PGW/SCEF 225 has been established.

PGW/SCEF 225 may provide (at 570) usage information, associated with UE 205, to GDAS 240. For example, PGW/SCEF 225 may, on a periodic or intermittent basis, provide information indicating how much data has been transferred to and/or from UE 205. In some embodiments, such as embodiments in which PGW/SCEF 225 has received information indicating a maximum amount of data that can be transferred to and/or from UE 205, PGW/SCEF 225 may notify (at 570) GDAS 240 when the maximum has been exceeded. In some embodiments, PGW/SCEF 225 may not send (at 570) any usage information to GDAS 240.

As mentioned above, FIG. 6 illustrates a signal flow that corresponds to the denial of access to UE 205. For example, UE 205 may output (at 605) an RRC setup request, including an indication that UE 205 is a group device. Base station 210 may request (at 610), an RRC token from GDAS 240. In the example shown here, GDAS 240 may determine (at 615) that an access token is not available. For instance, the group to which UE 205 belongs may have all of its allocated tokens already active for other devices. As another example, GDAS 240 may determine that UE 205 should be denied access for some other reason, such as removal from a group, a determination that UE 205 has exceeded an allocated data limit, etc.

Figure 6:
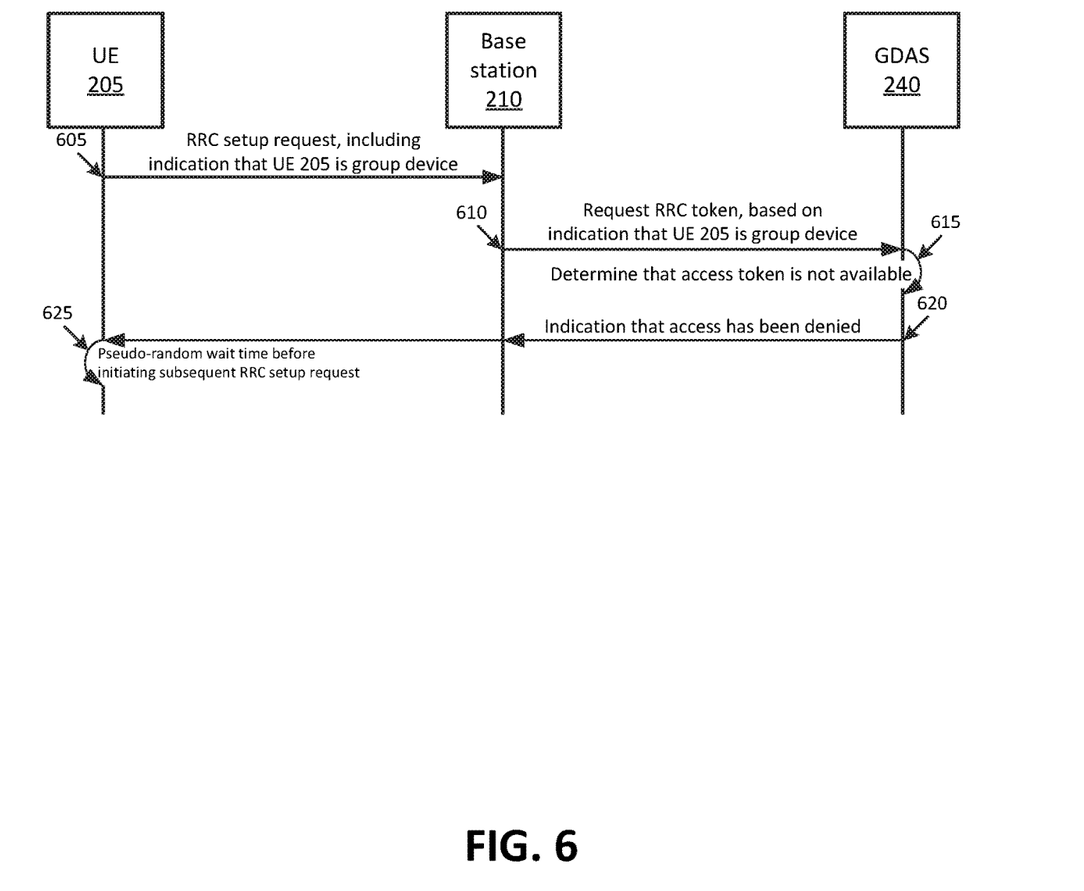
FIG. 6 illustrates an example signal flow for denying access to a device that is in a group registered with the GDAS.

GDAS 240 may output (at 620) an indication that access has been denied. Based on this indication, base station 210 may deny the RRC setup request, and may notify UE 205 that the request was denied. In some embodiments, UE 205 may reattempt to gain access to the network. For example, UE 205 may wait (at 625) a pseudo-random amount of time before waiting for requesting access again (e.g., before sending another RRC setup request to base station 210). In scenarios where relatively large quantities of UEs 205 request, and are denied, access, the pseudo-random wait before reattempting to gain access may help prevent base station 210 from becoming overloaded with requests for access. Additionally, the pseudo-random wait time may better ensure that most or all UEs 205 in a group eventually do receive access, instead of repeatedly requesting access at the same time.

In some implementations, when denying the request for an access token, GDAS 240 may specify a time at which UE 205 should reattempt to gain access. For example, GDAS 240 may determine such a time based on requests (from the same group) that have previously been accepted or denied, and/or based on active tokens and remaining durations and/or remaining amounts of data associated with the active tokens. In some implementations, GDAS 240 may use a flow control technique, such as a leaky bucket algorithm or a token bucket algorithm, in order to moderate requests for access tokens. In some embodiments, GDAS 240 may additionally, or alternatively, use another type of technique for managing requests, such as a First In First Out ("FIFO") queue, a Last In First Out ("LIFO") queue, a weighted fair queue, and/or another type of queue.

Figure 7:
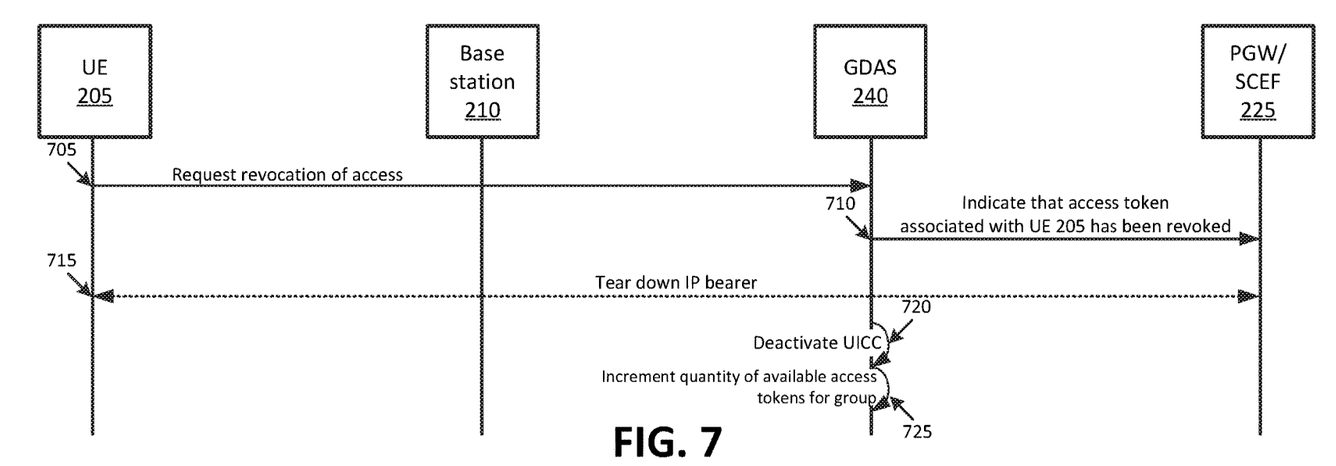
FIGS. 7-10 illustrate example signal flows relating to reclaiming access tokens for a group registered with the GDAS.

FIGS. 7-10 illustrate example signal flows that relate to the revocation of access tokens, once granted (e.g., after being granted according to the example shown in FIG. 5). FIG. 7, for example, illustrates an embodiment in which UE 205 may request that the temporary access be revoked. For instance, UE 205 may have completed its transmission of data, and may no longer need access to the network.

As shown, UE 205 may output (at 705), to GDAS 240, a request to surrender or terminate access. GDAS 240 may notify (at 710) PGW/SCEF 225 that the access, associated with UE 205, has been revoked. PGW/SCEF 225 may tear down, or terminate (at 715), a previously established IP bearer between PGW/SCEF 225 and UE 205. GDAS 240 may also deactivate (at 720) the UICC associated with UE 205. For instance, GDAS 240 may set the "Status" field, for UE 205 (e.g., in data structure 450) to "idle." GDAS 240 may also, in some embodiments, increment (at 725) the quantity of available access tokens for the group to which UE 205 belongs. As mentioned above, in some embodiments, the quantity of access tokens for the group may implicitly be incremented by virtue of the "Status" of UE 205 being set to "idle" in data structure 450.

Figure 8:
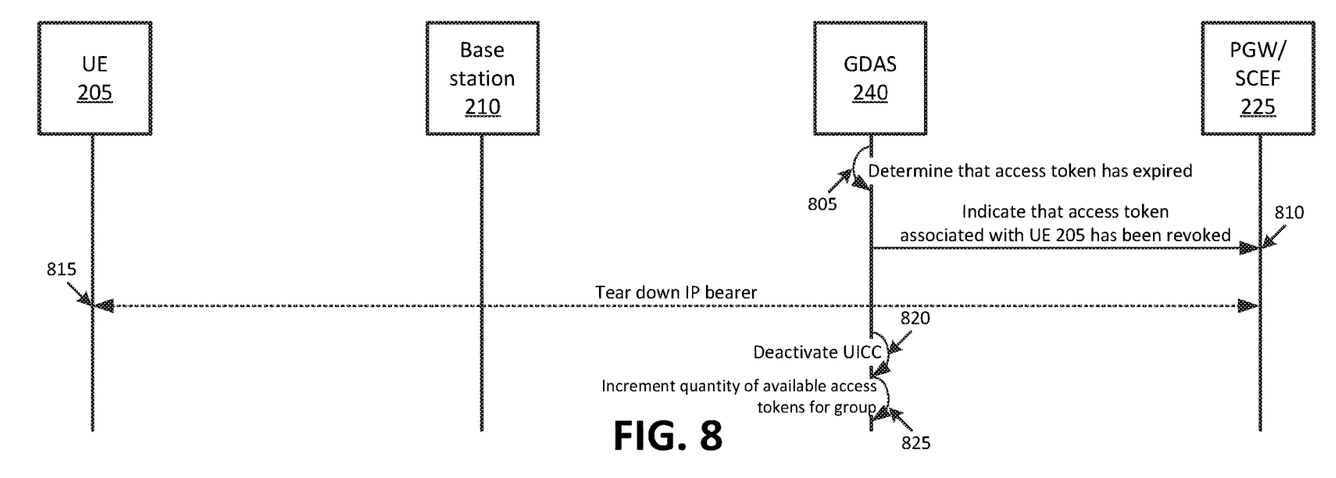

FIG. 8 illustrates an embodiment in which GDAS 240 initiates the access revocation process. For example, as shown, GDAS 240 may determine (at 805) that an access token, previously granted to UE 205, has expired. For instance, GDAS 240 may have tracked the duration of access, once granting the access token to UE 205. As another example, PGW/SCEF 225 may track the duration, and may notify GDAS 240 that the duration has expired. As yet another example, PGW/SCEF 225 may track the amount of data transferred to and/or from UE 205, and may notify GDAS 240 that the amount of data exceeds a threshold amount (e.g., the "Max data" field of data structure 400). As still another example, PGW/SCEF 225 may track the amount of data transferred to and/or from UE 205, and may notify (e.g., on an ongoing, period, and/or intermittent basis) GDAS 240 of the amount of data transferred. GDAS 240 may, based on the notifications, determine that the amount of data transferred to and/or from UE 205 exceeds the threshold amount.

Once GDAS 240 has determined that the access token has expired and/or should be revoked, GDAS 240 may notify (at 810) PGW/SCEF 225 that the access token associated with UE 205 has been revoked. PGW/SCEF 225 may proceed to tear down (at 815) an established IP bearer between UE 205 and PGW/SCEF 225, and GDAS 240 may deactivate (at 820) the UICC associated with UE 205 and increment (at 825) the quantity of available tokens for the group to which UE 205 belongs.

Figure 9:
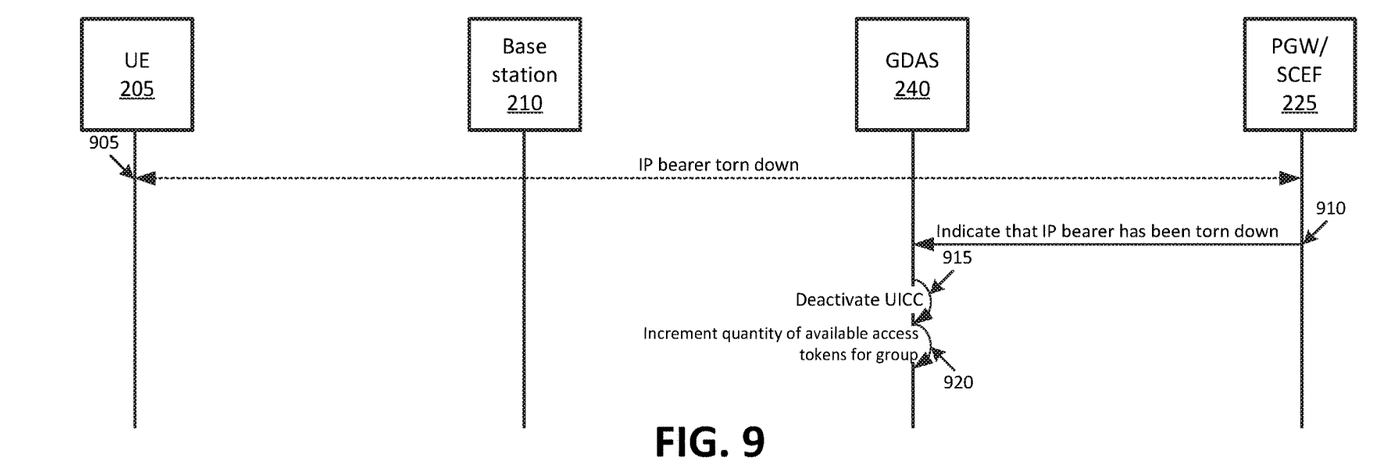

FIG. 9 illustrates an embodiment in which an established IP bearer, between UE 205 and PGW/SCEF 225, is torn down or terminated. For example, FIG. 9 covers scenarios where the bearer is torn down, or terminated (at 905), for an unspecified reason, such as a network outage and/or some other loss of connectivity between PGW/SCEF 225 and UE 205. In this example, PGW/SCEF 225 may notify (at 910) GDAS 240 that the IP bearer has been torn down. Based on this notification, GDAS 240 may deactivate (at 915) the UICC associated with UE 205 and increment (at 920) the quantity of available tokens for the group to which UE 205 belongs.

Figure 10:
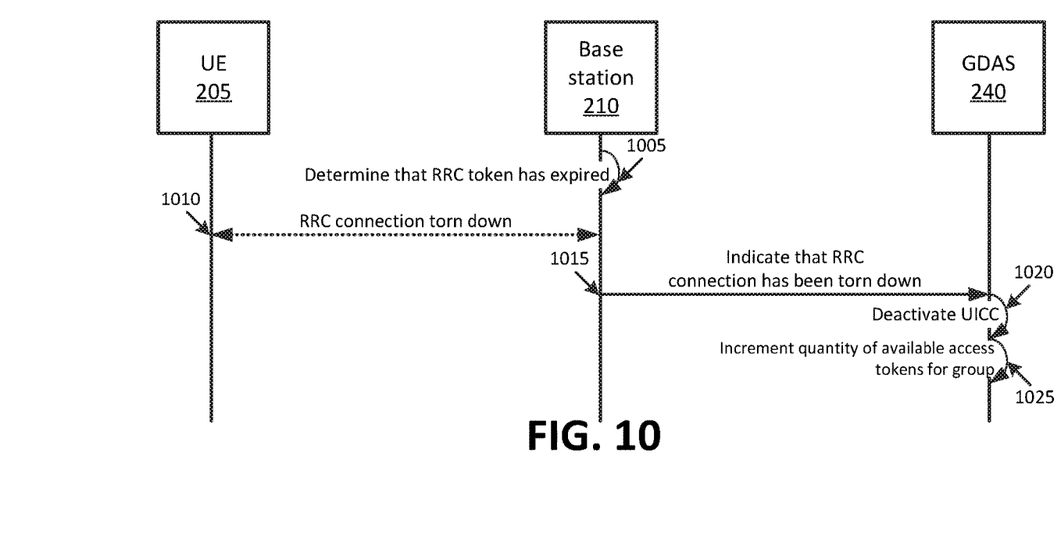

FIG. 10 illustrates an embodiment in which base station 210 triggers the revocation of access to UE 205. For example, as mentioned above, base station 210 may, in some embodiments, monitor the duration of access, and/or the amount of data transferred to and/or from UE 205. In this example, base station 210 may determine (at 1005) that the RRC token, associated with UE 205, has expired. For instance, base station 210 may determine, based on monitoring the duration and/or amount of data transferred, that duration and/or amount of data transferred has exceed a threshold associated with the RRC token. Base station 210 may tear down (at 1010) the RRC connection between UE 205 and base station 210, and may notify (at 1015) GDAS 240 that the connection has been torn down. The tearing down or termination of the RRC connection may, in some embodiments, automatically trigger an established IP connection between UE 205 and PGW/SCEF 225 to be torn down as well. GDAS 240 may deactivate (at 1020) the UICC associated with UE 205 and increment (at 1025) the quantity of available tokens for the group to which UE 205 belongs.

Figure 11:
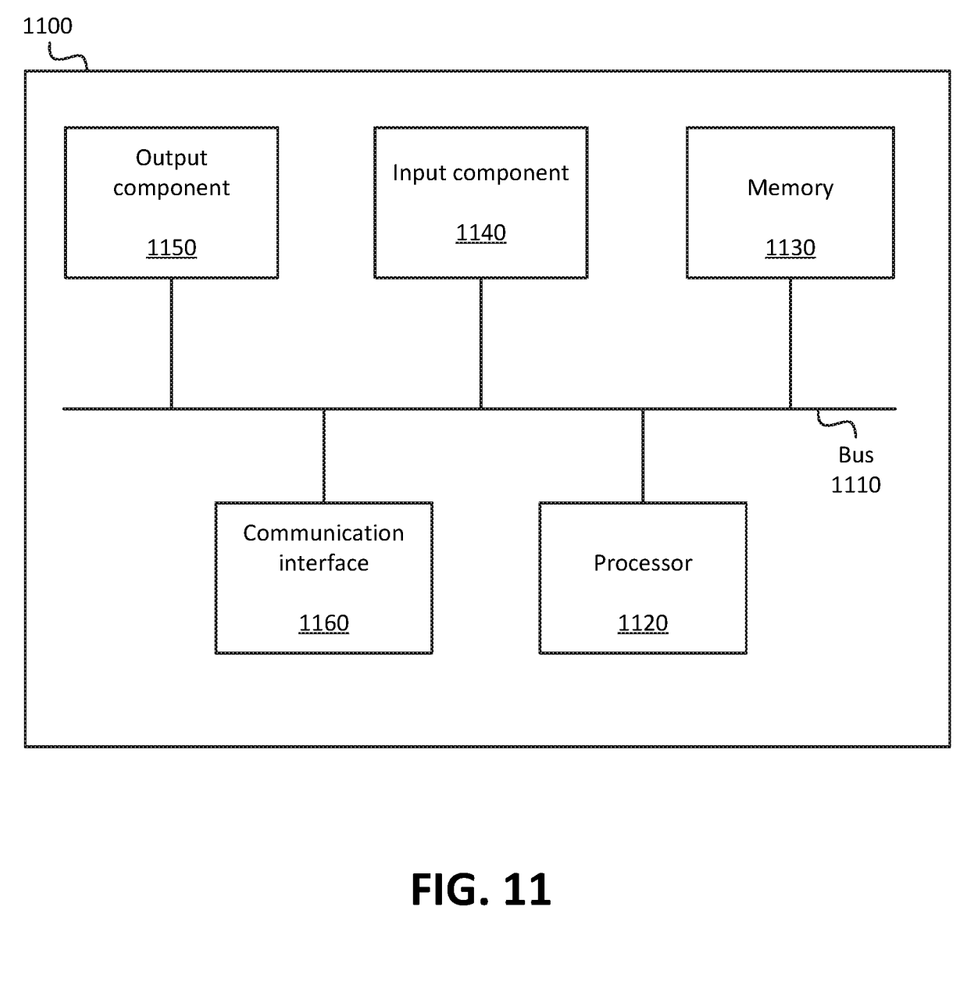
FIG. 11 illustrates example components of a device, in accordance with some implementations described herein.

FIG. 11 is a diagram of example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of signals have been described with regard to FIGS. 3 and 5-10, the order of the signals may be modified in other implementations. Further, non-dependent signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes, as may be appropriate for the situation and type of information. Storage and use of personal information may be in an appropriately secure manner reflective of the type of information (e.g., through various encryption and anonymization techniques for particularly sensitive information).

Some implementations described herein may be described in conjunction with thresholds. The term "greater than" (or similar terms), as used herein to describe a relationship of a value to a threshold, may be used interchangeably with the term "greater than or equal to" (or similar terms), unless a distinction is made herein that makes such an interpretation indefinite or inaccurate. Similarly, the term "less than" (or similar terms), as used herein to describe a relationship of a value to a threshold, may be used interchangeably with the term "less than or equal to" (or similar terms), unless a distinction is made herein that makes such an interpretation indefinite or inaccurate. As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
store information associating a plurality of sets of access tokens with a plurality of groups, wherein each group of the plurality of groups is associated with a particular set of access tokens of the plurality of sets of access tokens;
store association information regarding a plurality of user equipment ("UE") devices, wherein the association information regarding each UE device, of the plurality of UE devices, associates each UE device with a particular group of the plurality of groups;
receive, from a particular UE device, a request for access to a wireless network;
identify, based on the association information, a particular group, from the plurality of groups, with which the particular UE device is associated;
determine whether the particular set of access tokens, associated with the particular group, includes at least one available access token that is not currently assigned to another UE device of the particular group; and
selectively grant or deny access, for the particular UE device, to the wireless network based on whether the particular set of access tokens includes the at least one available access token.

2. The device of claim 1, wherein executing the processor-executable instructions further causes the one or more processors to:
decrement a quantity of available access tokens, in the particular set of access tokens, when granting the request for access, for the particular UE device, to the wireless network.

3. The device of claim 1, wherein executing the processor-executable instructions further causes the one or more processors to:
store information indicating a maximum access duration associated with the particular set of access tokens; and
enforce the maximum access duration when granting access to the particular UE device.

4. The device of claim 3, wherein executing the processor-executable instructions, to enforce the maximum access duration, further causes the one or more processors to:
terminate a connection, between the wireless network and the particular UE device, when a duration of the connection reaches or exceeds the maximum access duration associated with the particular set of access tokens.

5. The device of claim 1, wherein executing the processor-executable instructions further causes the one or more processors to:
receive an indication that a connection, between the wireless network and another UE device associated with the particular set of access tokens, has been terminated; and
increment a quantity of available access tokens for the particular set of access tokens based on the indication that the connection has been terminated.

6. The device of claim 1, wherein executing the processor-executable instructions further causes the one or more processors to:
notify, when granting access to the particular UE device, a base station of the wireless network that the base station is authorized to establish a connection between the base station and the particular UE device.

7. The device of claim 1, wherein executing the processor-executable instructions further causes the one or more processors to:
store information indicating a particular maximum amount of data that can be sent or received when access is granted via a token of the particular set of access tokens; and
enforce the particular maximum amount of data when granting access to the particular UE device.

8. A non-transitory computer-readable medium, storing a set of processor-executable instructions, wherein execution of the set of processor-executable instructions, by one or more processors of a server device, causes the one or more processors to:
store information associating a plurality of sets of access tokens with a plurality of groups, wherein each group of the plurality of groups is associated with a particular set of access tokens of the plurality of sets of access tokens;
store association information regarding a plurality of user equipment ("UE") devices, wherein the association information regarding each UE device, of the plurality of UE devices, associates each UE device with a particular group of the plurality of groups;
receive, from a particular UE device, a request for access to a wireless network;
identify, based on the association information, a particular group, from the plurality of groups, with which the particular UE device is associated;
determine whether the particular set of access tokens, associated with the particular group, includes at least one available access token that is not currently assigned to another UE device of the particular group; and
selectively grant or deny access, for the particular UE device, to the wireless network based on whether the particular set of access tokens includes the at least one available access token.

9. The non-transitory computer-readable medium of claim 8, wherein the processor-executable instructions further include processor-executable instructions to:
decrement a quantity of available access tokens, in the particular set of access tokens, when granting the request for access, for the particular UE device, to the wireless network.

10. The non-transitory computer-readable medium of claim 8, wherein the processor-executable instructions further include processor-executable instructions to:

store information indicating a maximum access duration associated with the particular set of access tokens; and enforce the maximum access duration when granting access to the particular UE device.

11. The non-transitory computer-readable medium of claim 10, wherein the processor-executable instructions, to enforce the maximum access duration, further include processor-executable instructions to:

terminate a connection, between the wireless network and the particular UE device, when a duration of the connection reaches or exceeds the maximum access duration associated with the particular set of access tokens.

12. The non-transitory computer-readable medium of claim 8, wherein the processor-executable instructions further include processor-executable instructions to:

receive an indication that a connection, between the wireless network and another UE device associated with the particular set of access tokens, has been terminated; and increment a quantity of available access tokens for the particular set of access tokens based on the indication that the connection has been terminated.

13. The non-transitory computer-readable medium of claim 8, wherein the processor-executable instructions further include processor-executable instructions to:

notify, when granting access to the particular UE device, a base station of the wireless network that the base station is authorized to establish a connection between the base station and the particular UE device.

14. The non-transitory computer-readable medium of claim 8, wherein the processor-executable instructions further include processor-executable instructions to:

store information indicating a particular maximum amount of data that can be sent or received when access is granted via a token of the particular set of access tokens; and enforce the particular maximum amount of data when granting access to the particular UE device.

15. A method, comprising:

storing information associating a plurality of sets of access tokens with a plurality of groups, wherein each group of the plurality of groups is associated with a particular set of access tokens of the plurality of sets of access tokens;

storing association information regarding a plurality of user equipment ("UE") devices, wherein the association information regarding each UE device, of the plurality of UE devices, associates each UE device with a particular group of the plurality of groups;

receiving, from a particular UE device, a request for access to a wireless network;

identifying, based on the association information, a particular group, from the plurality of groups, with which the particular UE device is associated;

determining whether the particular set of access tokens, associated with the particular group, includes at least one available access token that is not currently assigned to another UE device of the particular group; and selectively granting or denying access, for the particular UE device, to the wireless network based on whether the particular set of access tokens includes the at least one available access token.

16. The method of claim 15, further comprising:

decrementing a quantity of available access tokens, in the particular set of access tokens, when granting the request for access, for the particular UE device, to the wireless network.

17. The method of claim 15, further comprising:

storing information indicating a maximum access duration associated with the particular set of access tokens; and enforcing the maximum access duration when granting access to the particular UE device by terminating a connection, between the wireless network and the particular UE device, when a duration of the connection reaches or exceeds the maximum access duration associated with the particular set of access tokens.

18. The method of claim 15, further comprising:

receiving an indication that a connection, between the wireless network and another UE device associated with the particular set of access tokens, has been terminated; and incrementing a quantity of available access tokens for the particular set of access tokens based on the indication that the connection has been terminated.

19. The method of claim 15, further comprising:

notifying, when granting access to the particular UE device, a base station of the wireless network that the base station is authorized to establish a connection between the base station and the particular UE device.

20. The method of claim 15, further comprising:

storing information indicating a particular maximum amount of data that can be sent or received when access is granted via a token of the particular set of access tokens; and enforcing the particular maximum amount of data when granting access to the particular UE device.

* * * * *